United States Patent [19]

Sawa et al.

[11] Patent Number: 5,022,797
[45] Date of Patent: Jun. 11, 1991

[54] DIAMOND TOOL

[75] Inventors: Masashi Sawa; Masami Masuda; Yukio Maeda, all of Yokohama; Ryu Itoh, Ebina, all of Japan

[73] Assignee: Hitachi, Ltd., Tokyo, Japan

[21] Appl. No.: 343,830

[22] Filed: Apr. 24, 1989

Related U.S. Application Data

[63] Continuation of Ser. No. 48,600, May 11, 1987, abandoned.

[30] Foreign Application Priority Data

May 14, 1986 [JP] Japan .................. 61-108414
Sep. 9, 1986 [JP] Japan .................. 61-197635

[51] Int. Cl.$^5$ .................. B23B 27/02; B23B 27/20
[52] U.S. Cl. .................. 407/119; 407/120; 82/1.11
[58] Field of Search .................. 82/1.11; 407/113, 118, 407/119, 120

[56] References Cited

FOREIGN PATENT DOCUMENTS 2323808 11/1974 Fed. Rep. of Germany ...... 407/119
10164 2/1983 Japan .
37082 8/1983 Japan .
58-162 12/1983 Japan .
232702 12/1984 Japan .................. 407/119

Primary Examiner—William E. Terrell
Attorney, Agent, or Firm—Antonelli, Terry, Stout & Kraus

[57] ABSTRACT

A diamond tool for the mirror-finish cutting of non-ferrous materials and a method of manufacturing the same are provided. The diamond tool has a main cutting edge and minute side cutting edges formed at the opposite ends of the main cutting edge so as to intersect the main cutting edge at an angle. The dept $\Delta$ of chamfer of the side cutting edge is 1.5 to 5 times the depth of tears formed in the machined surface (0.1 $\mu m \leq \Delta \leq 1$ $\mu m$) and the length $l_2$ of the side cutting edged is 1.5 to 10 times the feed of the diamond tool (0.02 mm $\leq l_2 \leq 0.8$ mm). The rake face of the diamond tool comprises two rake faces and two side rake faces. A tool grinding surface plate for manufacturing the diamond tool has a flat surface for grinding the rake faces, and a circumferential tapered surface for grinding the side rake faces. The end relief surface and the rake face of the diamond tool is in the (001) zone of the single crystal diamond tip thereof, and the crystal orientation of the end relief surface is in the range of (150) and (010) or a crystallographic equivalent.

2 Claims, 8 Drawing Sheets

TOOL SETTING
ANGLE −10″

TOOL SETTING
ANGLE +30″

TOOL SETTING
ANGLE +60″

TOOL SETTING
ANGLE −10″

TOOL SETTING
ANGLE +30″

TOOL SETTING
ANGLE +60″

0.2 μm | 100 μm

DIAMOND TOOL

This is a continuation of application Ser. No. 048,600, filed May 11, 1987, now abandoned.

BACKGROUND OF THE INVENTION

The present invention relates to a diamond tool suitable for mirror-finish cutting of workpieces of non-ferrous metallic materials such as aluminum and copper and a method of manufacturing the same.

As is described in Jap. Pat. Pub. Nos. 58-10164 and 58-58162, a conventional tool is formed in a tool profile capable of cutting a workpiece in a satisfactory surface roughness and reducing scratches, on an assumption that the tool profile of the tool is transferred perfectly to the workpiece. However, in designing such a tool, no consideration is given with respect to tears in cutting a workpiece formed of a material of a cellular texture such as, for example, an aluminum alloy, and the reduction of residual stress in the workpiece through the reduction of cutting force.

In practical mirror-finish machining operation, the angle of the end cutting edge of a cutting tool to the direction of feed, namely, the entering angle, needs to be determined properly to prevent tears in the machined surface. However, no consideration has been given with respect to geometric surface roughness in designing the conventional tool.

Furthermore, no consideration is given to most single crystal diamond tools with respect to wear. Jap. Pat. Pub. No. 58-37082 refers to the wear of a diamond tool and infers that the burnishing effect of the back clearance face thereof exerted on a surface cut by the side clearance face thereof enables the mirror-finish cutting of the diamond tool. Therefore, Jap. Pat. Pub. No. 58-37082 provides a diamond tool having a back clearance face aligned with a crystal orientation appropriate for the moderate abrasion of the back clearance face, namely, a crystal orientation intermediate the orientations (110) and (010). Accordingly, the moderate abrasion of the diamond tool is necessary for mirror-finish cutting. Therefore, such a diamond tool is unsatisfactory in respect of abrasion resistance, and the possible cutting distance of the diamond tool in cutting an aluminum-magnesium alloy is 200 km or less.

SUMMARY OF THE INVENTION

It is therefore an object of the present invention to provide a diamond tool capable of mirror-finish cutting of non-ferrous materials such as aluminum and copper with a small cutting force without causing significant tears in the workpiece.

Another object of the present invention is to provide a diamond tool capable of reducing geometrical theoretical surface roughness for a given setting angle without deteriorating machining efficiency, and a method of manufacturing such a diamond tool.

A further object of the present invention is to provide a durable single crystal diamond tool.

To achieve the objects of the invention, in one aspect of the present invention, a diamond tool has a cutting edge chamfered at the opposite corners thereof by a sinkage $\Delta$ to form minute side cutting edges, the sinkage $\Delta$ being 1.5 to 5.0 times the depth b of tears in the surface machined (0.1 $\mu m \leq \Delta \leq 1$ $\mu m$), and the length $l_2$ of the minute cutting edge being 1.5 to 10 times the feed of the tool (0.02 mm $\leq l_2 \leq 0.8$ mm).

In another aspect of the present invention, the rake face of a tool has two rake faces and two side rake faces. That is, the rake face comprises a first rake face, a first side rake face, a second rake face and a second side rake face formed continuously in that order. A grinding surface plate employed in manufacturing such a diamond tool comprises a plane section for grinding the rake face, and a tapered circumferential section for grinding the side rake faces.

In a further aspect of the present invention, the tip of a single crystal diamond tool has an end relief surface and a rake face formed on zone (001), and the crystal orientation of the end relief surface is between zones (150) and (010) or a crystallographic equivalent.

DESCRIPTION OF THE PREFERRED EMBODIMENTS

Hereinafter preferred embodiments of the present invention will be described with reference to the accompanying drawings.

Figure 1:
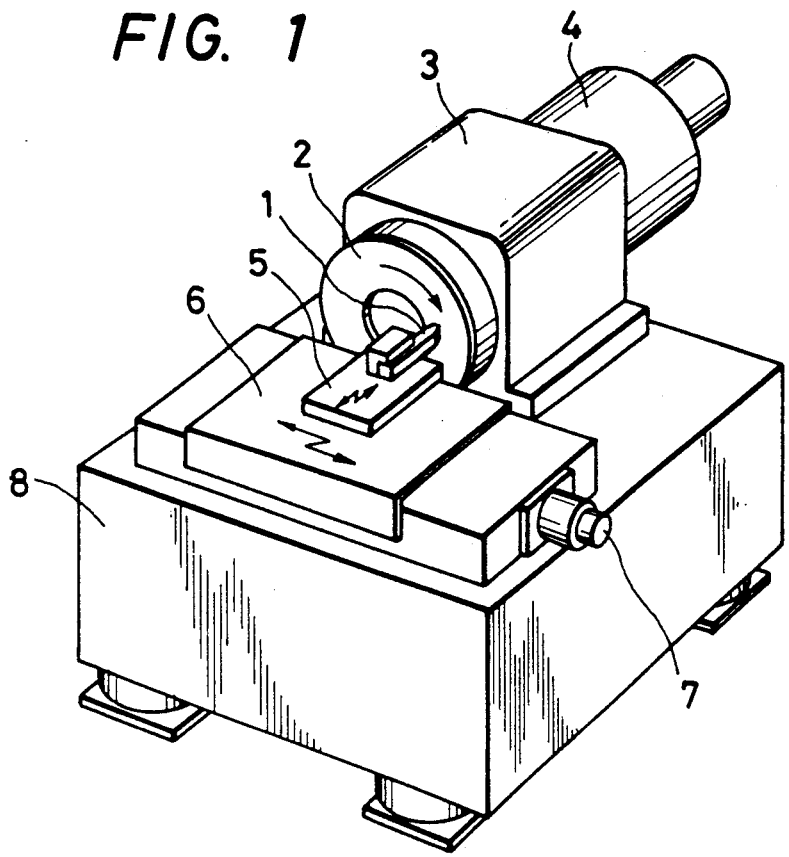
FIG. 1 is a perspective view of a lathe using a diamond tool for machining.
Figure 2:
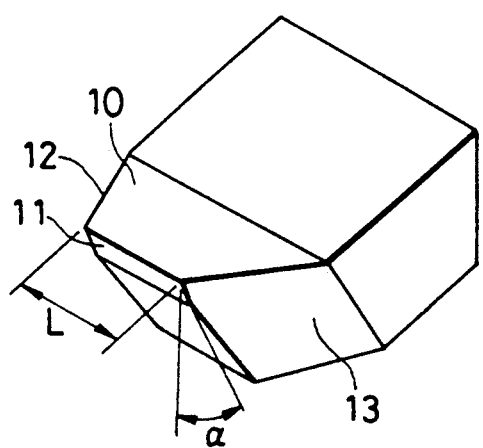
FIG. 2 is a perspective view showing the cutting edge portion of a conventional diamond tool.
Figure 3:
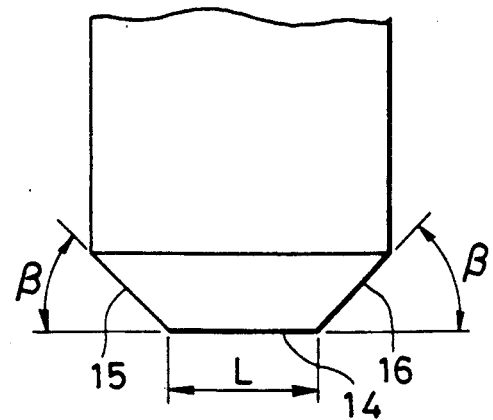
FIG. 3 is a plan view of the diamond tool of FIG. 2.
Figure 4:
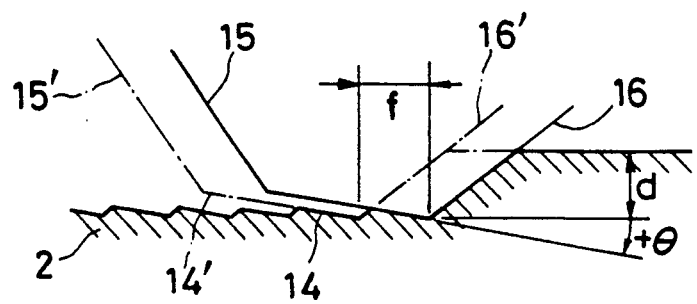
FIGS. 4 and 5 are plan views showing manners of cutting operation of a conventional diamond tool.
Figure 5:
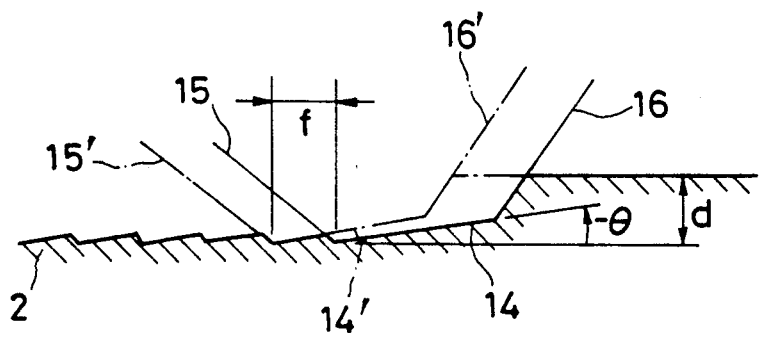

Referring to FIG. 1 showing a machine tool using a diamond tool for machining, securely mounted on a bed 8 are a headstock 3 for holding a workpiece 2, having a main spindle, and a motor 4 for rotatively driving the workpiece 2. A table 6 is mounted on the bed 8 so as to be slidable only along a direction perpendicular to the center axis of the headstock 3, namely, the cross feed direction. The rotation of a feed motor 7 is converted through a feed screw into the linear motion of the slider of the table 6. A tool slide 5 is mounted on the table 6 so as to be slidable in parallel to the center axis of the headstock 3, namely, the longitudinal feed direction. A tool 1 is secured to the tool slide 5. In machining operation, the annular workpiece 2 having a central opening is rotated by the motor 4, then the tool 1 is fed longitudinally by a predetermined depth of cut into the inner circumference of the workpiece 2 by moving the tool slide 5 toward the workpiece 2, and then the table 6 is moved along the end surface of the workpiece 2 toward the outer circumference of the same to machine the end surface of the workpiece 2. The conventional tool 1 for such a machining operation has a morphology as shown in FIG. 2. The cutting edge portion of the tool 1 comprises a rake 10, an end relief surface 11, and side relief surfaces 12 and 13. Referring to FIG. 3, the cutting edge section of the tool 1 comprises an end cutting edge 14 and side cutting edges 15 and 16. Generally, the length L of the end cutting edge 14 is on the order of 1 to 3 mm, and the approach angle $\beta$ is in the range of 30° to 45°. FIGS. 4 and 5 illustrate cutting modes of the tool 1 shown in FIGS. 2 and 3. In FIG. 4, the end cutting edge 14 is inclined to the right, as viewed in FIG. 4, relative to the direction of cross feed, while in FIG. 5, the end cutting edge 14 is inclined to the opposite side relative to the direction of cross feed. The latter disposition of the tool will be referred to as a negative tool setting, and the angle $-\theta$ will be referred to as a negative tool setting angle. In the machining operation with the positive tool setting as shown in FIG. 4, the end cutting edge 14 and the side cutting edge 16 are shifted from positions indicated at 14' and 16' to positions indicated at 14 and 16, respectively, while the workpiece 2 is rotated by one turn. This distance of shift will be referred to as a tool cross feed distance f. In the cutting operation with the positive tool setting, most chips are produced by the side cutting edge 16 as the same is shifted from the position indicated at 16' to the position indicated at 16. In the cutting operation with the negative tool setting (FIG. 5), the side cutting edge 16 produces thick chips while the end cutting edge 14 produces thin chips.

Figure 7:
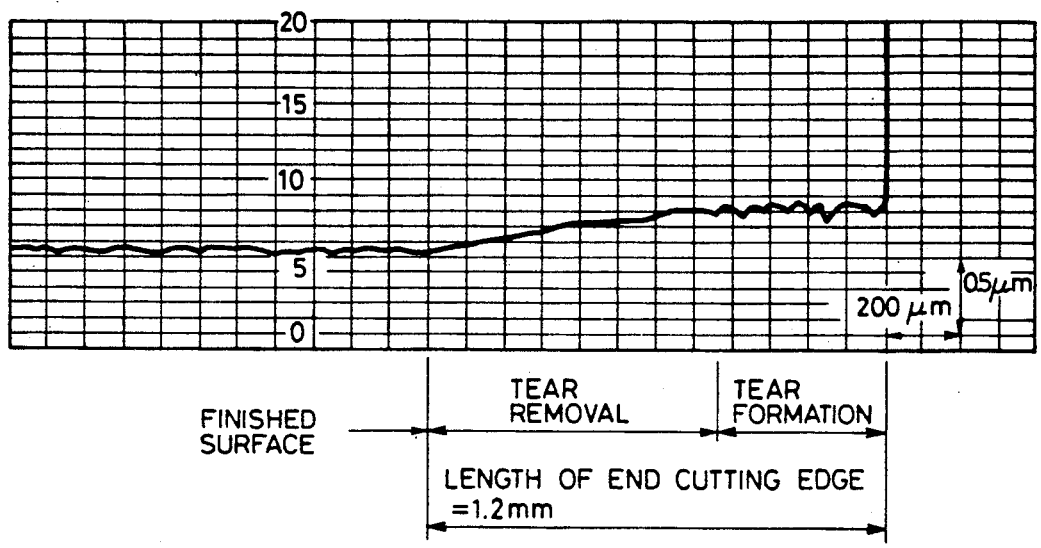
FIG. 7 is a graph showing the roughness of a machined surface having tears therein.

Through the experimental cutting of a workpiece of an aluminum-magnesium alloy with the positive tool setting and with the negative tool setting, the following facts were found. The roughness of a surface machined was 0.02 μmRz when the tool setting angle was −30″, and was 0.12 μmRz due to tearing when the tool setting angle was +30″. The same tears of 0.1 to 0.2 μm in depth were formed when the positive tool setting angle was in the range of 0° to 1°, while tears were formed when the negative tool setting angle was in the range of 0 to 20″. It is inferred that such a mode of tearing is due to the difference between the crystal grains of the aluminum-magnesium alloy in crystal orientation and that the crystal grains of a crystal orientation directed from the cutting direction toward the longitudinal feed direction are torn. During the cutting operation with the negative tool setting, a large shearing force is applied to the workpiece in producing a thick chip e between the positions of the side cutting edge 16 indicated at 16 and 16' tearing the crystal grains of the material and, after the passage of the side cutting edge 16, the end cutting edge 14 cuts off a thin chip g of a thickness c by a small shearing force. Accordingly, when the height a of the end cutting edge 14 is greater than the depth b of tears, the surface of the workpiece 2 is finished in a mirror surface without any residual tear therein. The roughness of a surface formed by quickly retracting a square nose straight tool during the cutting of a workpiece of an aluminum-magnesium alloy with the tool set at a negative tool setting angle of −1′10″ to transfer the tool profile to the workpiece was measured by a surface roughness gauge. The result is shown in FIG. 7, from which it is seen that the tears are removed by the end cutting edge and any tear is left on the finished surface. The depth of tears is dependent on the purity of the aluminum of the aluminum-magnesium alloy; the depth of tears is in the range of 0.1 to 0.15 μm when the purity of aluminum is 99.9%, and is in the range of 0.15 to 0.25 μm when the purity of aluminum is 99.99%. The negative tool setting angle needs to be reduced to cut the workpiece in a satisfactory surface roughness. However, the excessive reduction of the negative tool setting angle leaves tears in the finished surface deteriorating the surface roughness. The cutting force, particularly, the component of the cutting force in the direction of the depth of cut, namely, the back force $F_N$, needs to be reduced to finish the workpiece at an accurate flatness. Increase in the negative tool setting angle increases the back force deteriorating the flatness of the surface machined. For example, with the conventional tool shown in FIG. 4, measured back forces $F_N$ were approximately 20 gf, approximately 100 gf, and in the range of 10 to 25 gf when the tool was set at a negative tool setting angle of −10″, a negative tool setting angle of −30″ and a positive tool setting angle in the range of 0 to 6′, respectively. The flatness of a disk of 130 mm in outside diameter and 2 mm in thickness was deteriorated from 2 to 3 μm when the tool setting angle was −10″ or +30″ to 5 to 10 μm when the tool setting angle was −30″. From the foregoing facts, it is difficult to cut a workpiece with the conventional tool to machine a workpiece in a surface roughness of 0.02 μmRz and a flatness of 3 μm or better.

Figure 8:
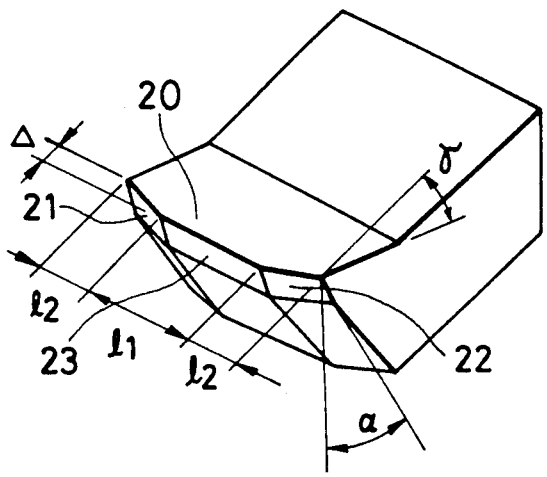
FIGS. 8 and 9 are perspective views of conventional diamond tools, respectively.
Figure 9:
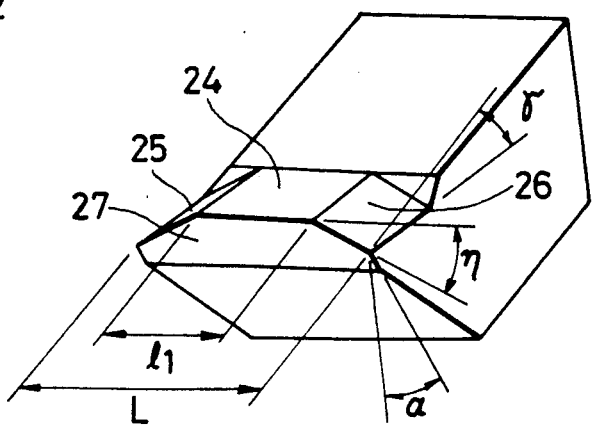

FIGS. 8 and 9 show further conventional tools, which are formed in tool profiles intended for reducing scratches and improving the roughness of the surface machined which is geometrically dependent on the tool profile. Accordingly, the tool profile of these conventional tools are defined by the following conditions: end relief angle $\gamma = 30″$ to 3°, rake angle $\alpha = -3°$ to −6°, length of the central end cutting edge $l_1 = 1.5$ to 4 mm, length $l_2$ of the side cutting edges = 0.8 to 3 mm, end relief angle $\alpha'$ of the opposite corners of the end cutting edge = 30″ to 3°, and depth $\Delta$ of chamfer at the opposite corners of the end cutting edge = 1 to 50 μm or a value slightly greater than the depth of cut.

The present invention has been made through the elucidation of the mechanism of producing tears remaining in the finished surface of a soft metal, particularly, an aluminum alloy, when the surface is machined with a square nose straight diamond tool, which has not been known, and provides a square nose straight diamond tool capable of removing tears and finishing a work in a satisfactory flatness when set at a tool setting angle in the range of 60″ to −30″ depending on the correlation between the cutting force and the flatness.

Figure 6:
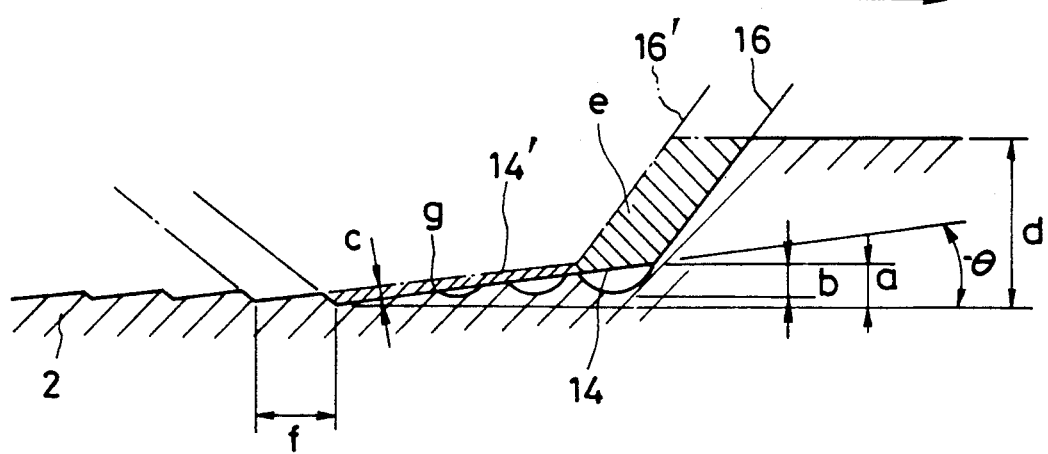
FIG. 6 is a view of assistance in explaining the process of occurrence of tears.
Figure 10:
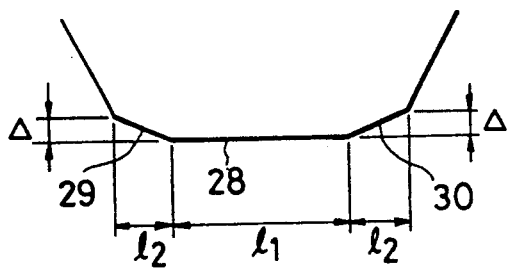
FIG. 10 is a plan view showing the cutting edge portion of a diamond tool in accordance with the present invention.
Figure 11:
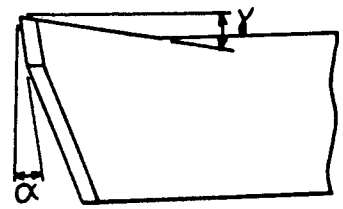
FIG. 11 is a side elevation showing the cutting edge portion of a diamond tool in accordance with the present invention.

Referring to FIGS. 10 and 11 showing a diamond tool, in a preferred embodiment, according to the present invention, the end cutting edge of the diamond tool comprises a central cutting edge 28 and side cutting edges 29 and 30 formed at the opposite corners of the central cutting edge 28, respectively. The side cutting edges 29 and 30 function to remove tears as shown in FIGS. 6 and 7. The requisite conditions of the end cutting edge for removing tears were determined on the basis of the results of experimental cutting operation under various cutting conditions so as to meet the following conditions: $\Delta = N \times b (1.5 \leq N \leq 5, 0.1 \mu m \leq \Delta \leq 1 \mu m)$ and $l_2 = M \times f(1.5 \leq M \leq 10, 20 \mu m \leq l_2 \leq 0.8 mm)$, where $\Delta$ is the depth of chamfer of the side cutting edges, b is the depth of tears, $l_2$ is the length of the side cutting edges, and f is the cross feed of the tool for one turn of the workpiece 1. During the machining operation, the tool and the workpiece vibrate minutely relative to each other due to the vibration of the floor on which the machine tool is installed deteriorating the roughness of the surface machined. It was confirmed experimentally that the direct effect of the minute vibration of the tool relative to the workpiece on the workpiece is mitigated when the length $l_1$ of the central cutting edge is in the range of 0.5 to 1.5 mm owing to the interference of the tool with the workpiece. Although not the features of the present invention, the rake angle $\gamma$ and the end relief angle $\alpha$ are further essential conditions of the tool, a rake angle in the range of $-3°$ to $20°$ and an end relief angle in the range of $30''$ to $10°$ prevent the minute chipping of the cutting edge in grinding the tool and hence the function of the cutting edge profile of the tool of the present invention will not be deteriorated.

The performance of the diamond tool of the present invention will be described hereinafter in comparison with that of conventional square nose straight diamond tools, in which:

Type A (conventional square nose straight diamond tool of FIG. 2): length of the end cutting edge = 1.2 mm, angle $\beta$ of the side cutting edge = 45°, end relief angle $\alpha = 3°$, rake angle = 3°.

Type B (diamond tool of the present invention shown in FIGS. 10 and 11): depth $\Delta$ of chamfer of the side cutting edges = 0.4 $\mu$m, length $l_2$ of the side cutting edges = 0.2 mm, length $l_1$ of the central cutting edge = 0.8 mm, rake angle $\gamma = 3°$, end relief angle $\alpha = 3°$.

Type C (conventional diamond tool of FIG. 8): length $l_2$ of the side cutting edges = 1.2 mm, length $l_1$ of the central cutting edge = 2.0 mm, rake angle $\alpha = -3°$, end relief angle $\alpha = 3°$, end relief angle of the side cutting edges = 3°, depth of chamfer of the side cutting edges = 2.4 mm.

Type D (conventional diamond tool of FIG. 9): width L of the cutting edge = 4.4 mm, length $l_1$ of the central cutting edge = 2.0 mm, end relief angle $\alpha = 3°$, rake angle $\gamma = 0°$, inclination $\eta$ of the side rake faces = 2.2°, depth $\Delta$ of chamfer = 2.4 $\mu$m.

Figure 12A:
FIGS. 12a to 12f are graphs comparatively showing the roughness of surfaces machined with a diamond tool of the present invention and a conventional diamond tool, respectively.
Figure 12B:
Figure 12C:
Figure 12D:
Figure 12E:
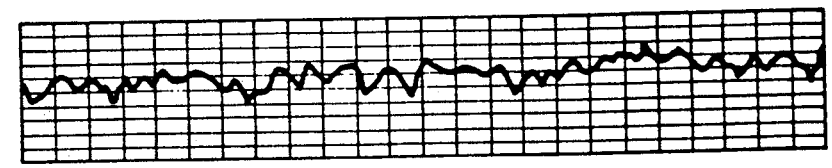
Figure 12F:
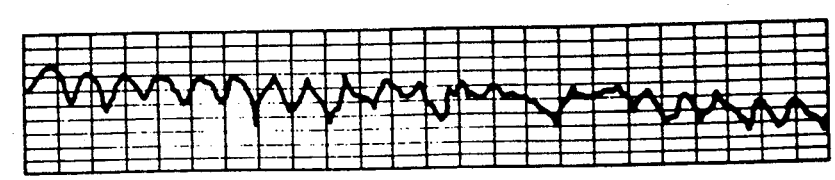

FIGS. 12a to 12f are the graphical illustration of the surface roughness of workpieces of an aluminum-magnesium alloy (aluminum purity: 99.9%) machined by Type A (conventional diamond tool of FIG. 2) and type B (diamond tool of the present invention of FIGS. 10 and 11) under the same cutting conditions for three tool setting angles. The tool setting angle of type B is represented by the inclination of the central cutting edge relative to the surface of the workpiece. FIGS. 12a to 12c show the surface roughness of workpieces cut with Type B, while FIGS. 12d to 12f show those of workpieces cut with Type A. As is obvious from FIGS. 12a to 12f, even when Type B is set at a tool setting angle which causes Type A to produce tears, Type B does not produce tears and finishes the surface in a satisfactory surface roughness.

Aluminum-magnesium alloy disks of 130 mm in outside diameter and 2 mm in thickness each having a central opening were machined with Type B, Type C (conventional diamond tool of FIG. 8) and Type D (conventional diamond tool of FIG. 9) under the same cutting conditions. The tools were set at a tool setting angle of $+30''$, where the tool setting angle of the side cutting edges was approximately $+6'30''$. The surface roughnesses of the disks thus machined were substantially the same (0.02 $\mu$mRz). However, the back force $F_N$ of Type B was approximately 30 gf, which was smaller than the back force $F_N$ of approximately 150 gf of Type C and type D, and the radial straightness of the disk cut with Type B was on the order of 2 $\mu$m, which was satisfactory as compared with the radial straightness of 5 to 10 $\mu$m of the disks cut with Type C and Type D.

Thus, diamond tools having tool profiles meeting the tool profile conditions of the present invention are able to remove tears remaining in the machined surface and may be set at a small tool setting angle, so that the surface roughness of the machined surface is improved and the back force is reduced; consequently, the flatness and straightness of the machined surface are improved.

On the other hand, the diamond tool is required to cut a workpiece in a further reduced surface roughness for mirror-finish cutting. The inventors of the present invention studied the influence of tool setting angle on geometrical theoretical surface roughness and have invented a diamond tool capable of cutting a surface in a further satisfactory surface roughness and a method of manufacturing the same.

Figure 13A:
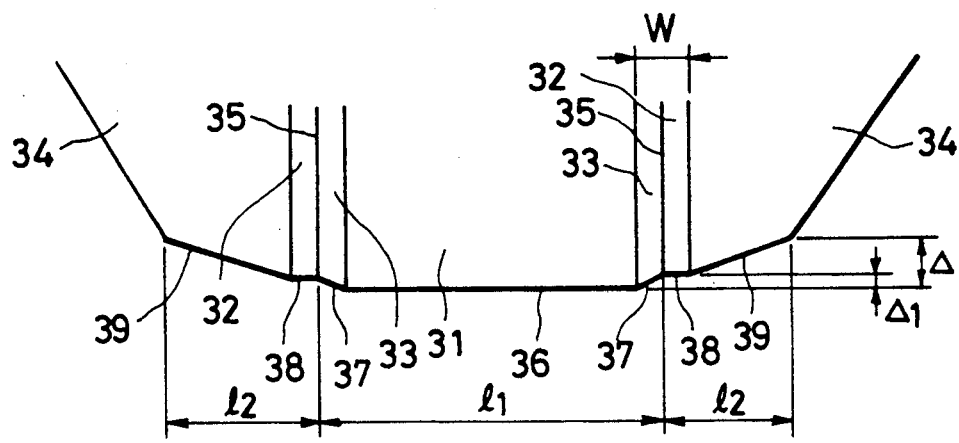
FIG. 13a is a plan view showing the cutting edge portion of a diamond tool in accordance with the present invention.
Figure 13B:
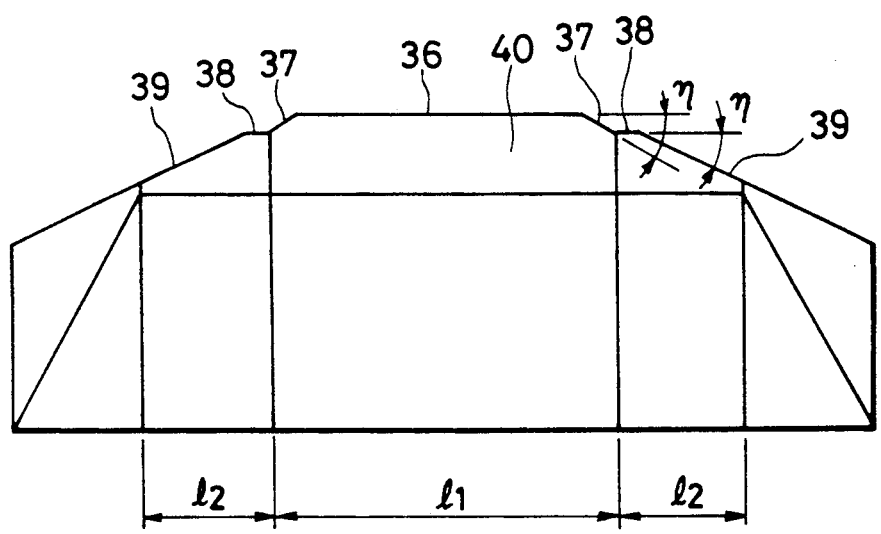
FIG. 13b is a front elevation showing the cutting edge portion of a diamond tool in accordance with the present invention.
Figure 13C:
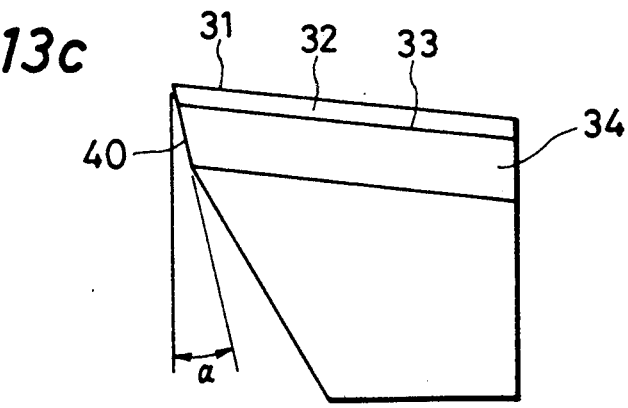
FIG. 13c is a side elevation showing the cutting edge portion of a diamond tool in accordance with the present invention.

FIGS. 13a, 13b and 13c are a plan view, a front elevation and a side elevation, respectively, of a diamond tool having a tool profile, in another embodiment, in accordance with the present invention.

Referring to FIGS. 13a, 13b and 13c, the diamond tool has a rake face comprising a first rake face 31, second rake faces 32, first side rake faces 33 and second side rake faces 34. Cutting edges 36, 37, 38 and 39 are defined by the rake faces 31 and 32, the side rake faces 33 and 34 and the end relief surface 40. Since each first side rake face 33 is inclined at an angle $\eta$ to the first rake face 31 and the end relief surface 40 is inclined at a end relief angle $\alpha$ to a vertical plane, the cutting edge 38 is sunk by a distance $\Delta_1$ relative to the cutting edge 36. Similarly, since the second side rake face 34 is inclined at an angle $\eta$ to the first rake face 31 and the end relief surface 40 is inclined at the end relief angle $\alpha$ to a vertical plane, the cutting edge 39 is sunk by a distance $\Delta$ relative to the cutting edge 36. The distances are expressed by: $\Delta = l_2 \cdot \tan \alpha \cdot \tan \eta$ and $\Delta_1 = W/2 \cdot \tan (\alpha \cdot \tan \eta)$. Thus, V-grooves 35 are formed in the rake face terminating at the cutting edge comprising the cutting edges 36, 37, 38 and 39.

The effect of thus formed diamond tool of the present invention will be described in comparison with that of the conventional diamond tool with reference to FIGS. 14a and 14b.

Figure 14A:
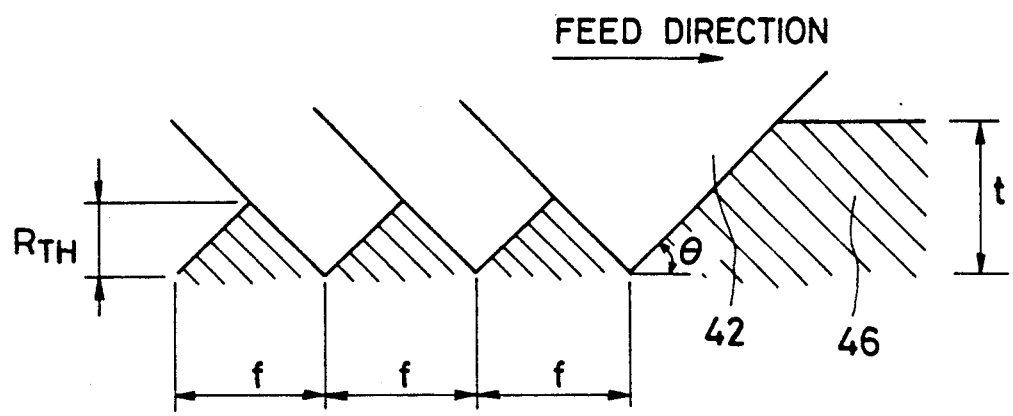
FIG. 14a is a typical illustration of the cutting mode of a conventional tool.

Referring to FIG. 14a showing a cutting mode of a conventional diamond tool 42, a work piece 46 is rotated in a direction perpendicular to the sheet while the diamond tool 42 is set at a tool setting angle θ and is fed to the right, as viewed in FIG. 14a. The feed is f and the depth of cut is t. Since the tool setting angle θ is fixed, the feed f needs to be reduced to reduce geometrical theoretical surface roughness $R_{TH}$.

Figure 14B:
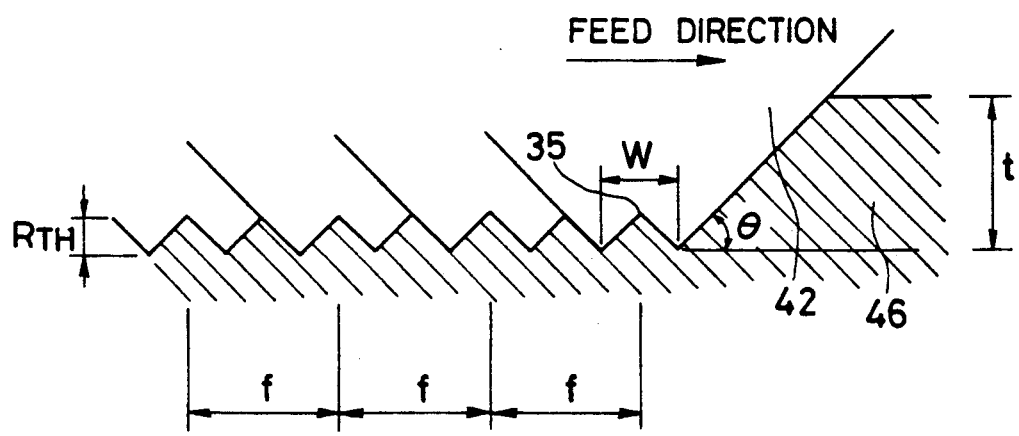
FIG. 14b is a typical illustration of the cutting mode of a diamond tool in accordance with the present invention.

Referring to FIG. 14b showing a cutting mode of the diamond tool 42 of the present invention, since the diamond tool 42 has V-grooves 35, the geometrical theoretical surface roughness $R_{TH}$ is dependent on the depth of the V-grooves 35, and hence the $R_{TH}$ in FIG. 14b is half the $R_{TH}$ in FIG. 14a at the maximum. Furthermore, in repairing the diamond tool of the present invention, only a single surface, namely, the end relief surface, needs regrinding, which facilitates regrinding the diamond tool.

A method of manufacturing the foregoing diamond tool of the present invention will be described hereinafter with reference to FIGS. 15, 16a and 16b.

Figure 15:
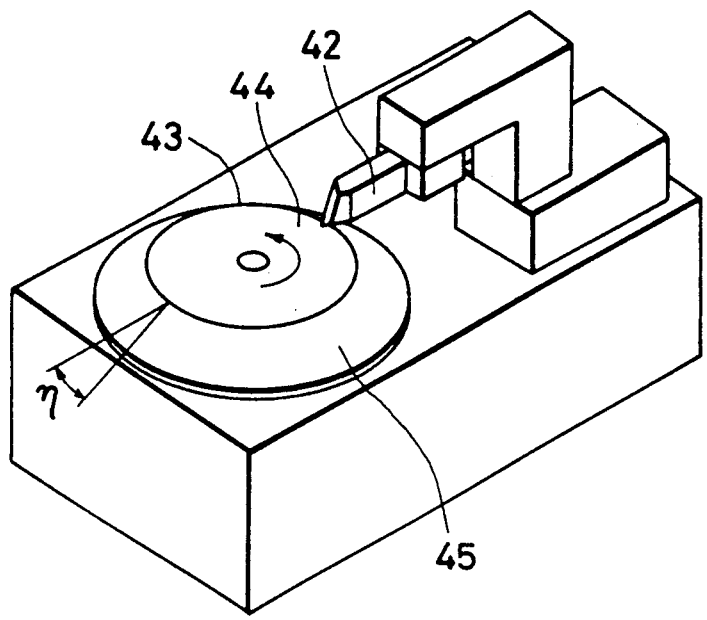
FIG. 15 is a perspective view of a tool grinding machine.

Referring to FIG. 15, a tool grinding surface plate 43 has a rake face grinding section 44 for grinding the first rake face of the diamond tool 42, and a side rake face grinding section 45 for grinding the side rake faces of the same. The side rake face grinding section 45 is inclined to the rake face grinding section 44 at an angle corresponding to the side rake angle η of the diamond tool. The tool grinding surface plate 43 is rotated and the diamond tool 42 is pressed against the tool grinding surface plate 43.

Procedures of manufacturing the diamond tool of the present invention on the tool grinding machine having the tool grinding surface plate 43 will be described with reference to FIGS. 16a and 16b.

Figure 16A:
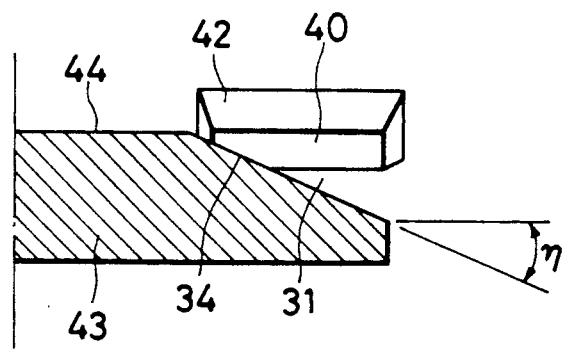
FIGS. 16a and 16b are illustrations of assistance in explaining a method of grinding a diamond tool in accordance with the present invention.
Figure 16B:
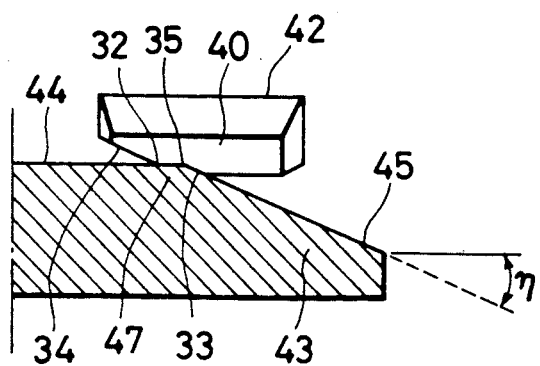

Referring to FIG. 16a, after grinding the rake face 31 and the end relief surface 40 of the diamond tool 42, the second side rake face 34 of the diamond tool 42 is ground by means of the side rake face grinding section 45 of the tool grinding surface plate 43. Then, as shown in FIG. 16b, the first side rake face 33 and the second rake face 32 of the diamond tool 42 are ground simultaneously by means of the circular edge 47 defined by the rake face grinding section 44 and the side rake face grinding section 45 of the tool grinding surface plate 43 to form the V-groove 35 in the diamond tool 42.

Figure 17:
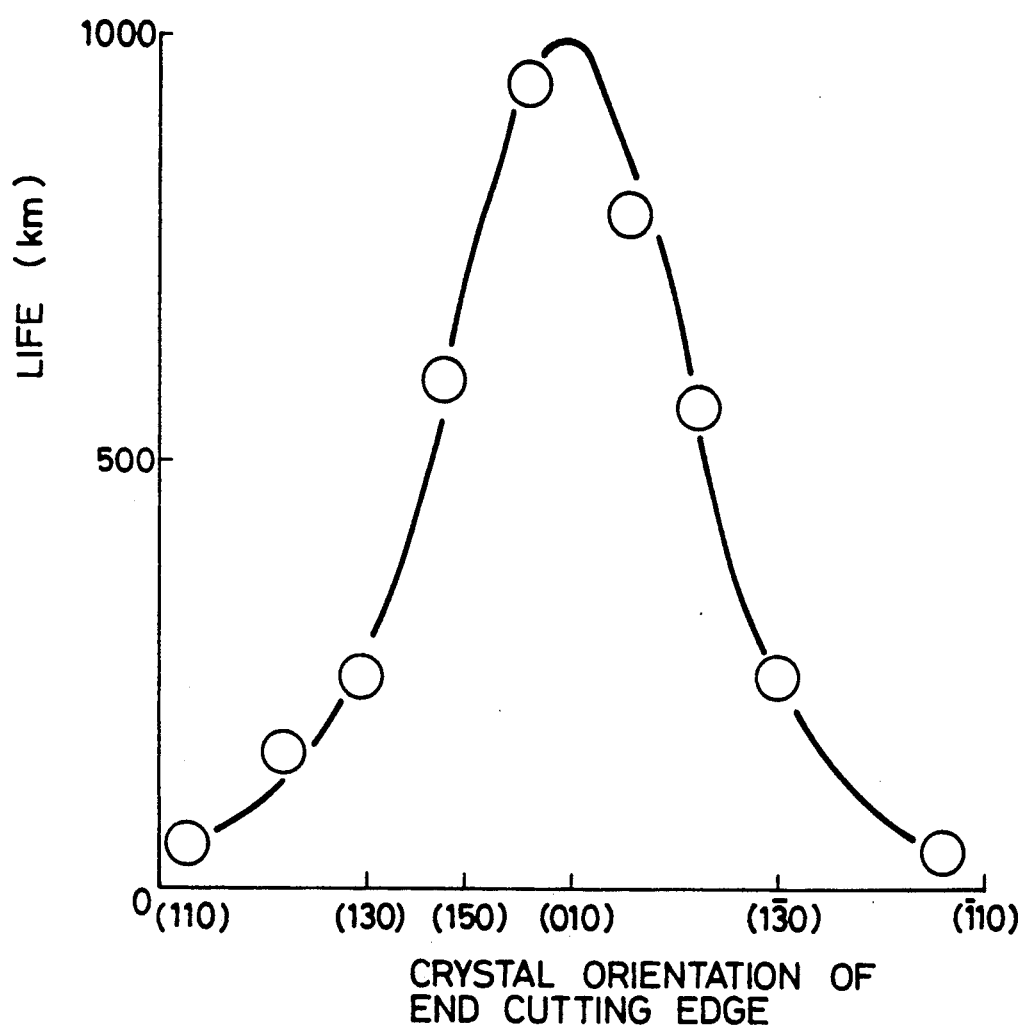
FIG. 17 is a graph showing the crystal orientation of the end relief surface of a diamond tool in accordance with the present invention.

FIG. 17 is a graph showing the variation of the life, namely, cutting distance in which the diamond tool is able to cut the surface of a workpiece in a desired surface roughness, of the diamond tool of the present invention in cutting an aluminum-magnesium alloy with the crystal orientation of the end relief surface. It is known from FIG. 17 that the life of the diamond tool is quite satisfactory when the crystal orientation of the end relief surface is (010). However, when the crystal orientation of the end relief surface is between (010) and (110), abnormal abrasion called as boundary abrasion occurs in the diamond tool. Accordingly, the life of the diamond tool can be extended up to 800 to 1000 km, which is four to five times that of the conventional diamond tool, when the end relief surface of the diamond tool is formed so that the crystal orientation thereof is, from the practical point of view, between (150) and (010) or a crystallographic equivalent.

Thus, the diamond tool of the present invention is capable of cutting non-ferrous materials such as aluminum in a mirror-finish surface at a small cutting force without producing tears in the surface, and has a long life four to five times that of the conventional diamond tools.

Although the invention has been described in its preferred forms with a certain degree of particularity, it is to be understood to those skilled in the art that many changes and variations are possible in the invention without departing from the scope and spirit thereof.

What is claimed is:

1. A diamond tool for mirror-finish cutting of nonferrous materials, provided with a single crystal diamond tip, said diamond tip comprises: a flat rake face; a forward end relief surface; a main cutting edge defined by the line of intersection of said rake face and said end relief surface; a side cutting edge formed at an end of said main cutting edge, said side cutting edge having a finite length so as to extend at an inclination to said main cutting edge rearwardly from said main cutting edge so that the end of said side cutting edge is displaced rearwardly of said main cutting edge by a depth of chamfer, the length of said main cutting edge being 0.8 mm, the length of said side cutting edge being 0.2 mm, and the depth of chamfer of said side cutting edge being 0.4 um so that said side cutting edge is sunk diagonally relative to said main cutting edge.

2. A diamond tool as recited in claim 1, wherein a side cutting edge is formed at each of opposite ends of said main cutting edge rearwardly from said main cutting edge so that the ends of the side cutting edges are displaced rearwardly of said main cutting edge by a depth of chamfer, and wherein the length of each side cutting edge is 0.2 mm and the depth of chamfer thereof is 0.4 um so that said side cutting edges are sunk diagonally relative to said main cutting edge.

* * * * *